Patented Nov. 7, 1939

2,179,203

UNITED STATES PATENT OFFICE 2,179,203

MANUFACTURE OF SIRUPS

Leo Stein, East Orange, N. J., and James F. Walsh and Haskell C. Needle, Chicago, Ill.; said Walsh and said Needle assignors to American-Maize-Products Company, a corporation of Maine No Drawing. Application March 17, 1937, Serial No. 131,366

15 Claims. (Cl. 99—142)

Sirups prepared from malted grains are used extensively in the baking, confectionery and brewing industries, but the manufacture of these sirups requires an involved procedure which has kept the cost rather high. The present invention relates to the manufacture of a sirup produced from unmalted corn, wheat or grain adapted to be used for many of the purposes for which malt sirups prepared from malted grains have heretofore been employed and one which may be produced at a much lower cost.

We have found that a malt-like sirup can be produced by mixing together a thin sugar liquor or sirup and a dilute solution of water-soluble proteins or protein bodies derived from natural starchy substances such as grains or potatoes, and then concentrating the mixture and giving it an appropriate heat treatment. For the purposes of illustration our process is here described as it is used in connection with the corn refining industry but it is not limited to such industry In the manufacture of corn starch, it is customary to soak the corn in a very dilute solution of sulphur dioxide (sulfurous acid) which process is customarily known as the "steeping" process, after which the corn is cracked and the germ removed and the residual starchy bodies subjected to various processes such as conversion to produce sugars and sirups. The steep water in which the corn has been soaked usually contains a substantial percentage of soluble ingredients of the corn, particularly proteins, but also has some undesirable substances. Nevertheless, we have discovered that this steep water can be given an inexpensive treatment which will remove these undesirable elements and then the treated liquid, if mixed with a sugar sirup such as the sirup obtained from corn or other type of sugar or obtained directly by conversion of corn starch and given a proper heat treatment, will give an ultimate product adapted to be used in place of malt sirup.

Some important uses of our invention include fields where yeast is employed. Such uses include the employment of the sirup in the brewing industry and also its use in baking. In these fields the protein content of the sirup is important as a food for the yeast cells. Furthermore, in brewing, the protein content of our product will also produce body and foamstand in the finished beer or ale. In baking it will also improve the finished product by giving it better taste and appearance. In addition to these fields of use, the sirup, because of its characteristic flavor and sugar content, has been found to have value in the manufacture of candies. In addition its agreeable flavor and wholesome composition make it pleasant and nutritive food for direct human consumption.

We have found that when one is preparing steep water for use in a sirup of the type covered by this invention, it is advisable to remove from the steep water those proteins which will coagulate on heating and also remove some or all of the sulphur dioxide compounds and eliminate the excess acidity of the water. As a general rule, we prefer to keep relatively low the concentration of material which will leave a residue of ash on analysis. An unduly high ash content would indicate the presence of an excess of inorganic salts which might tend to render the liquid salty and these materials might also tend to produce an undesirable grittiness in the concentrated sirup which would make it impracticable for many uses. However, some salts, particularly the phosphates, and some of the native salts of the corn, are desirable in the finished product.

We have found that the undesirable ingredients can be eliminated without destroying a residue of desirable proteins and other desirable ingredients through the simple expedient of neutralizing the steep waters to approximate neutrality or very slightly on the acid side, say to a pH of between 5 and 7 and preferably between 6 and 7; a value of 6.2 has given satisfactory results. For such neutralization we prefer to use ordinary hydrated lime but other basic materials which will form substantially insoluble sulfites or sulfates may be used.

If desired, the steep water may be given a preliminary boiling for a few minutes, which coagulates some of the proteins and drives off free sulphur dioxide. However, such treatment is not always necessary and we have found that proper neutralization at ordinary room temperature ordinarily will cause the precipitation of undesirable proteins as well as the precipitation of the major portion of the soluble sulfites or sulfates if these are present in sufficient concentration to be precipitated. The removal of proteins which will coagulate on heating is desirable, for they would be of no value because their coagulation during sterilization would render them non-assimilable by the organism, and their presence would render it difficult to standardize the product from a physiological viewpoint. The same treatment will remove some of the salts so that actually there is a direct reduction in the ratio of ash to protein, and after filtration the remaining liquid carries a substantial percentage of desirable protein and protein derivatives without being unduly salty or bitter. While the neutralization might slightly pass over to the alkaline side, any substantial alkalinity usually should be avoided, as ordinarily it is very undesirable to have an alkaline taste in the finished product. However, when this is not objectionable for any reason, as where there is subsequent acidification, complete neutralization may be had at this stage, although when actual alkalinity is had, the phosphates tend to precipitate as tricalcium phosphate and the removal of all the phosphates and certain other native salts of the corn is not usually desirable.

We have found that ordinarily no particular steps need be taken to remove sulphur dioxide, as the major portion of the free compound will come off during subsequent concentration. If complete elimination of sulphur dioxide and its compounds is to be accomplished either before or after neutralization, the mixture may be treated with an oxidizing agent such as potassium chlorate or hydrogen peroxide.

After the steep water is neutralized as above specified, and carefully filtered, it is combined in any appropriate manner with a sirup, which ordinarily will be a sirup obtained by conversion of cornstarch. We find it advantageous to blend the steep water with the sirup while the latter is in dilute form, that is, in the form of the converted, neutralized and filtered starch liquor. Then, after adjusting the acidity of the mixture, it is concentrated in any desired manner to the appropriate specific gravity—commonly about 42° Bé. The amount of steep water to be used may be varied widely according to the particular qualities which are desired in the final product, but we have found that the best results are obtained when the mixing is so carried out that a finished sirup of 42° Bé. will have a protein content in excess of .5% and preferably in excess of 1.5% and ranging up to 6%, and an ash content not much above about 2%. A good protein content is between 3% and 5%. These values will of course vary with sirups of different gravity. Under certain conditions such for example as where a high protein content is desired with low ash, we may use a sirup with a high protein content made by treating in the conversion operation a mixture of starch and proteins from which the soluble proteins have preferably first been removed as by washing; or soluble proteins or protein derivatives obtained from the same or other sources may be added.

It is now quite common custom to use in the steeping process, water which has already been more or less circulated through the starch house. This tends to increase the protein content of the steep water and such cycled water can advantageously be used as the steep water of our process.

The color of the modified steep water, particularly when obtained from a circulating system, is usually deep brown. When mixed with light glucose liquors and concentrated and treated under conditions giving only moderate amounts of colorization, it gives a golden yellow to brown sirup. This color is ordinarily satisfactory but it may be modified in usual manners, as by the addition of coloring matter or by decolorizing with usual decolorizing agents.

While some valuable qualities may be obtained by blending the sirup and treated steep waters after concentration is more or less complete, our experience indicates that the only way that the desired flavor can be obtained is to have at least a part (and preferably all) of the concentration carried on after blending, and have the concentrating operation followed by a special heating operation. We have found that if the concentrated mixture, after being brought to the desired sirupy consistency in the vacuum pan, is heated to a temperature of about 165° F. (which means that the vacuum must be reduced or broken) and is held at that temperature for a short time, the sirup will darken slightly and develop a characteristic malt aroma and flavor which adds greatly to its value. Without intending to be limited by any particular theory, we believe that this result is due to an interaction of the proteins or their cleavage products on the carbohydrates forming new compounds which we may term amino sugar compounds. We use this term to designate a wide group of products which are difficult to identify and which may include, for example, bodies ranging from the glyco proteids to the hexose amines. The particular amino sugar compounds resulting from the present reaction when heated have aromatic properties similar to those contained in malt and as stated they tend to darken.

The temperature of 165° F. is not critical, for the result will take place at lower temperatures (say above 150°) if a longer time is used; and higher temperatures may be employed if the total time at reaction temperature is not too long. Due to the fact that the sirup tends to cool quite slowly, if high temperatures are employed artificial cooling may be necessary to prevent the formation of too much coloring matter. The time of treatment at a given temperature will depend upon the amount and intensity of flavor that is to be developed, and this can be carried to suit the selection of the operator. Generally speaking, we have found that satisfactory results are had by holding the batch at 165° C. between 5 and 30 minutes in addition to the heating and cooling periods.

Ordinarily, the acidity of the liquor will be adjusted before concentration, and an adjustment to a pH of about 5 with an acid such as lactic acid will conform to accepted practice. Phosphoric acid can be used.

Our invention can be readily understood from the following specific example:

Steep water obtained from the treatment of corn was found on analysis to have a total solid content of 8.2% and an ash of 1.24% with a protein content of 3.5%. This steep water was treated with hydrated lime to a pH of about 6.2 and was then filtered. The resulting liquid had a total solid content of 6.9%, an ash of .88% and a protein content of 3.4%. One part by volume of the treated steep water was mixed with 3 parts of converted, neutralized starch liquor of 13° Bé. The resulting mixture was then adjusted with lactic acid to a pH of about 5 and concentrated under vacuum to a gravity of 42° Bé. The vacuum was then broken and the temperature was raised to about 165°. The sirup darkened slightly and gradually developed a marked malty odor. After about 10 minutes the heat was turned off and the batch allowed to cool. The resulting sirup had a protein content of 4.5 and an ash of 1.3. Due to the presence of maltose and dextrine and as a result of the special heat treatment, it had good body and an excellent flavor. Its color was a golden brown. The finished sirup contained soluble proteins and protein derivatives, and appreciable amounts of organic and inorganic phosphates, dextrose, maltose, dextrine and mineral salts.

The protein and protein derivative content was present in sufficient quantity so that when the sirup was diluted to the proper strength for fermentation there was present an adequate supply of assimilable nitrogen to maintain maximum micro-organism action.

The phosphates present to the extent of about 10% of the ash content of the sirup were sufficient to supply a proper amount of this activating agent to energize the micro-organism action.

The presence of maltose and dextrine together with the products which we have termed amino sugar compounds resulting from heating, serve to impart body and malt flavor to the final sirup and are valuable elements in the fermentation uses and also in the making of candy.

In this application when reference is made to proteins, we intend to include also protein derivatives ranging down to amino-acids. The protein content is computed by determining the nitrogen content (Kjeldahl method) and converting on the factor of 6.25 which is accepted in the industry.

While we have described this invention as applied to the corn refining industry and as using steep water for corn reacted with corn sirup conversion products, we believe that the invention is broader than this and is applicable generally to the treatment of dilute solutions of water-soluble proteins derived from natural starchy substances, combined with various types of sugar liquors. Thus in place of the steep water from corn we may use corresponding aqueous extracts obtained from other grains such as wheat or rice or obtained from other starch-bearing materials such as potatoes, it being understood that in each case it is advisable to eliminate the soluble proteins which will coagulate on heating and to neutralize where necessary. Also, in place of the corn sirup, we may use other types of starch conversion products made from other starches and with varying percentages of dextrose content. Further we may substitute other sugars and sirups such as those derived from sugarcane in whole or in part for the starch conversion products.

After the sirup having the malt flavor is prepared as described above, it may be used in any desired way either in its liquid state, or it may be dried in any well-known manner.

What we claim is:

1. A method of producing a malt-like sirup from corn steep water and corn sirup comprising first substantially neutralizing the steep water to effect precipitation of the heat coagulable proteins, filtering to remove the precipitated materials, blending the filtered steep water with a corn sirup, concentrating the resulting liquid to produce a sirup of the desired consistency and thereafter heating said sirup sufficiently to impart to the sirup a characteristic malt aroma and flavor.

2. A method as defined in claim 1, in which the steep water is first neutralized to a pH of 5 to 7.

3. A method as defined in claim 1 in which the concentrated sirup is heated to a temperature of at least 150° F. to produce the desired malt aroma and flavor.

4. A method as defined in claim 1 in which the admixture of filtered steep water and corn sirup is slightly acidified before concentrating.

5. A method as defined in claim 1, in which the concentrated sirup is heated to a temperature of about 165° F. for a period of about 5 to 30 minutes.

6. A method as defined in claim 1 in which the admixture of filtered steep water and corn sirup comprises about one part by volume of said steep water and three parts by volume of said corn sirup.

7. In a method of producing a malt-like sirup by heating together corn steep water and a starch conversion sugar solution the improvement which comprises first substantially neutralizing the steep water to effect precipitation of the heat coagulable proteins, oxidizing the soluble sulphur compounds therein, removing the precipitated materials, and thereafter heating the thus treated steep water with the starch conversion sugar solution to effect the desired malt aroma and flavor in the final reaction product of the steep water and sugar solution.

8. In a method of producing a malt-like sirup by reacting together a starch conversion sugar solution with a dilute acidic solution of water soluble protein derived from unmalted natural starchy substances and containing heat coagulable proteins, the improvement which comprises substantially neutralizing said solution of proteins to precipitate the heat coagulable proteins, removing the precipitated proteins and thereafter reacting said protein and sugar solutions.

9. In a method of producing a malt-like sirup by heating together corn steep water and a starch conversion sugar solution, the improvement which comprises oxidizing sulphur dioxide and compounds thereof present in the steep water by treating the steep water with an oxidizing agent selected from the group consisting of potassium chlorate and hydrogen peroxide, substantially neutralizing the steep water to effect precipitation of the heat coagulable proteins therein, and removing the precipitated materials before the steep water is mixed with the starch conversion sugar solution so that said coagulated proteins and sulphur dioxide will not prevent formation of the desired malt aroma and flavor in the final reaction product of the steep water and sugar solution.

10. A method of producing a malt-like sirup as defined in claim 8, in which the unmalted natural starchy substances are selected from a group consisting of corn, wheat, rice and potatoes.

11. A method of producing a malt-like sirup as defined in claim 8, in which the starch conversion sugar solution is corn sirup.

12. As a new composition of matter, a synthetic sirup having a malt-like aroma and flavor and obtained by heat reacting an acid converted starch solution containing relatively large amounts of dextrose with a substantially neutralized solution of water soluble proteins derived from unmalted natural starch substances, and which solution has been substantially freed of heat coagulable proteins, said sirup having substantial amounts of heat modified dextrose which in conjunction with the reaction products thereof with said water soluble proteins provides the desired aroma and flavor of malt.

13. A sirup as defined in claim 10 in which the water soluble protein solution is an aqueous solution of non-coagulable proteins and other solubles obtained from corn and the acid converted starch solution is corn sirup.

14. A sirup as defined in claim 10 in which the acid converted solution when first blended with the protein solution is in the form of a dilute, converted, neutralized and filtered starch liquor.

15. A synthetic malt-like sirup as defined in claim 10 and which contains protein in an amount of from about 0.5% to 6%.

LEO STEIN.
JAMES F. WALSH.
HASKELL C. NEEDLE.

CERTIFICATE OF CORRECTION.

Patent No. 2,179,203. November 7, 1939.

LEO STEIN, ET AL.

It is hereby certified that error appears in the printed specification of the above numbered patent requiring correction as follows: Page 3, second column, lines 59, 64, and 69, claims 13, 14, and 15 respectively, for the claim reference numeral "10" read --12--; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.